United States Patent Office 3,514,714
Patented May 26, 1970

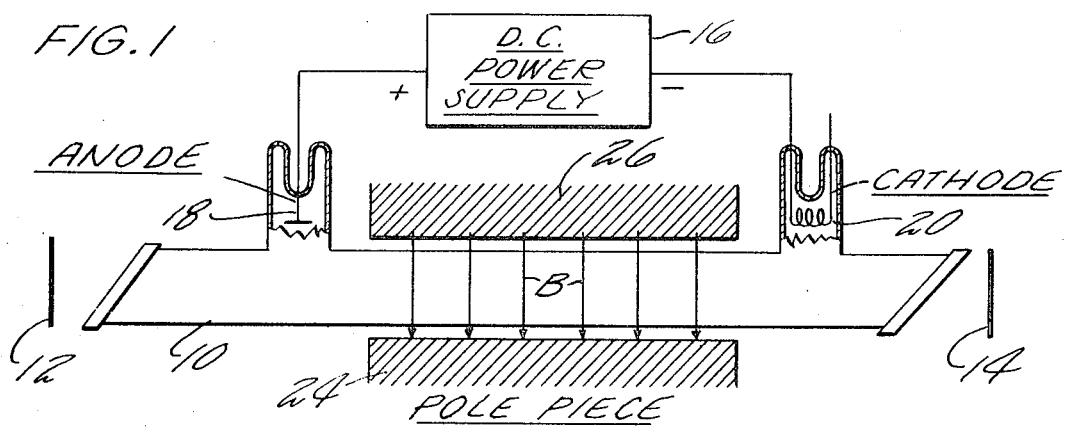
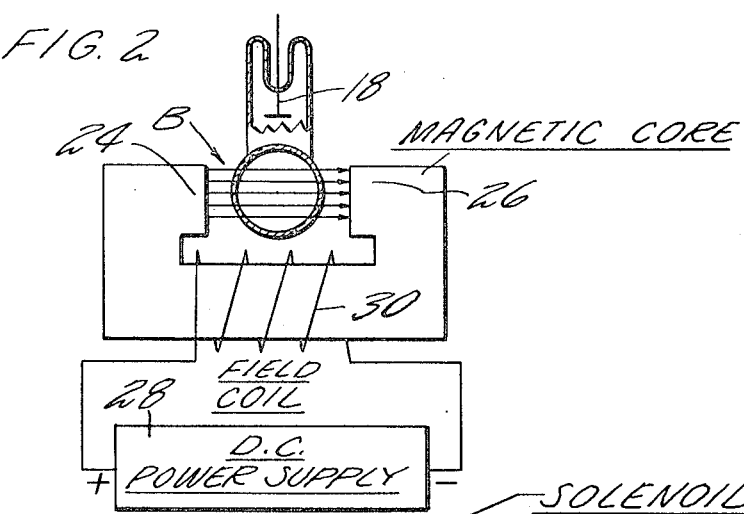
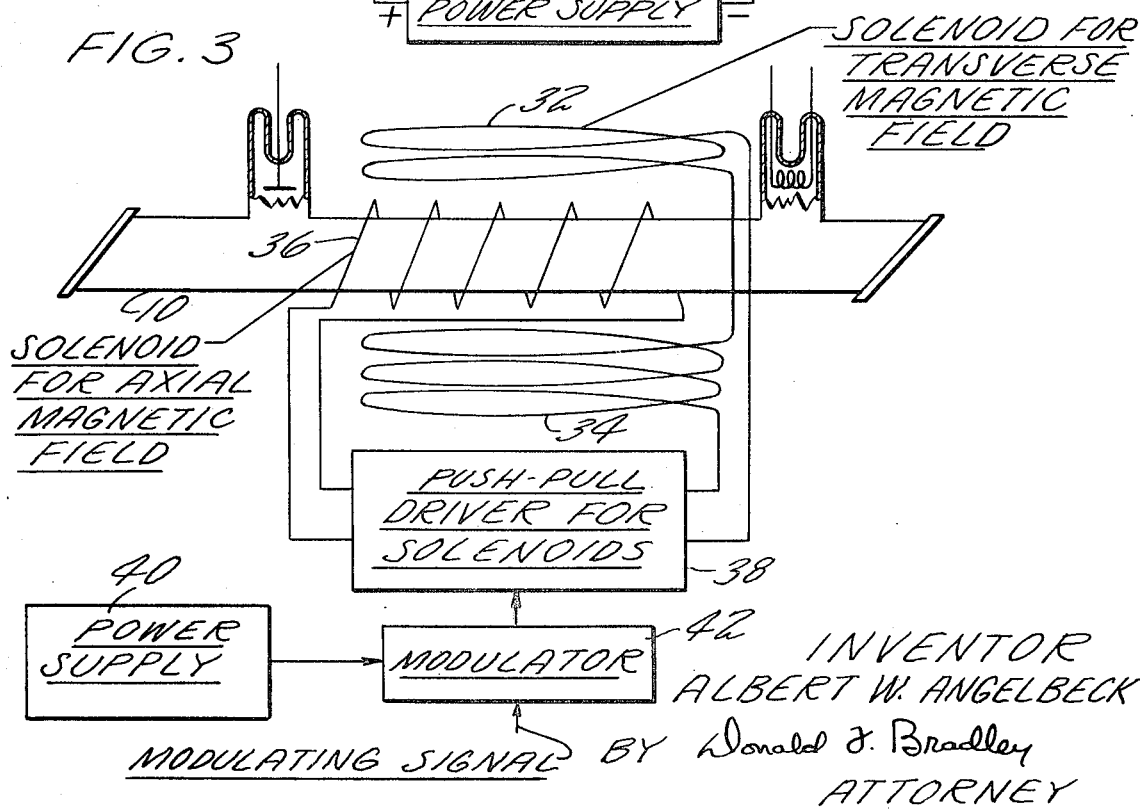

3,514,714
GAS LASER HAVING AXIAL AND TRANSVERSE MAGNETIC FIELDS CONNECTED IN PUSH-PULL RELATIONSHIP
Albert W. Angelbeck, East Hartford, Conn., assignor to United Aircraft Corporation, East Hartford, Conn., a corporation of Delaware
Filed July 16, 1965, Ser. No. 472,551
Int. Cl. H01s 3/10
U.S. Cl. 331—94.5                3 Claims

ABSTRACT OF THE DISCLOSURE

The light output and power from a DC discharge gas laser is increased by generating a magnetic field and applying the field transversely across the laser. Varying the transverse magnetic field permits control of the laser output. Simultaneous application of transverse and axial magnetic fields through the laser provides push-pull type modulation with low power requirements.

---

This invention relates to gas lasers, and particularly to a method and apparatus for increasing and controlling the light output of a gas laser by applying a transverse magnetic field to the laser.

Gas lasers possess many advantages compared with other types of lasers. The light output of a gas laser has a high degree of both spatial and time coherence, and with proper design the long term frequency stability can be made very high. The gas laser also will operate continuously without excessive cooling requirements. However, the light output power of a gas laser in continuous wave operation is limited to milliwatts. In order to fully capitalize on the inherent properties of the gas laser it is desirable to have a higher level of output power.

It has been found that a transverse magnetic field applied to a DC discharge gas laser increases the electron temperature and hence the efficiency of excitation of the upper laser level, thereby resulting in a higher light and power output for a given geometry gas laser. Further, varying the transverse magnetic field permits control of output light intensity independently of DC excitation, thereby providing a means for modulating the light output. The simultaneous use of axial and transverse magnetic fields results in a "push-pull" type of modulation which produces light intensity modulation requiring less power than the use of either an axial or transverse magnetic field independently since the same depth of modulation will be achieved by varying each field only half as much as would be required if each field was used separately, and power dissipated in the solenoids is proportional to the magnetic field squared.

It is therefore an object of this invention to provide a novel method and apparatus for increasing the light output intensity of a gas laser.

Another object of this invention is a novel method and apparatus for modulating the light output intensity of a gas laser.

A further object of this invention is a novel push-pull modulation method and apparatus for a gas laser.

A still further object of this invention is a transverse magnetic field for controlling a gas laser.

These and other objects and a fuller understanding of this invention may be had by referring to the following description and claims, read in conjunction with the accompanying drawings, in which:

FIG. 1 shows a conventional DC gas laser with a transverse magnetic field applied thereto; and
FIG. 2 is an end view of the gas laser of FIG. 1; and
FIG. 3 shows a gas laser with the novel push-pull modulation apparatus.

The principal limitation of the gas laser is the low power output. For maximum optical gain in the discharge it is desirable to have monoenergetic electrons with an energy that will preferentially excite the upper laser level. However, in the positive column of a DC excited gas laser there is a spread in energy of the electrons. The mean energy is much lower than the desired energy for the electrons. An increase in population inversion will occur with a corresponding increase in light output if the mean energy of the electrons is increased since this increases the percentage of electrons at the desirable energy level.

In a positive column discharge the electron temperature is controlled primarily by the product of PD, where P is the gas pressure and D is the diameter of the laser tube. Electron temperature, Te, is inversely proportional to PD and thus a small value of PD is required to give a high value of Te. A high gas pressure P is advantageous, however, for creating a high density of excited atoms in the laser. In order to maintain a small PD and high pressure, the tube diameter D must be small. However there is a lower limit for tube diameter which is determined by diffraction losses in the laser. These conflicting requirements for gas pressure and tube diameter determine an optimum PD for a maximum of light output with a given gas laser material.

This invention increases the electron temperature in a gas laser of given diameter operating at a given pressure, or conversely produces the same temperature at a higher pressure by applying a transverse magnetic field to a DC discharge gas laser. Referring to FIG. 1 there is shown a conventional DC discharge gas laser comprising a long, enclosed glass tube 10 filled with a gas such as a helium-neon mixture, argon or krypton. The ends of the tube 10 are slanted at the Brewster angle. Reflective mirrors 12 and 14 are positioned adjacent the ends of tube 10, one of the mirrors being less reflective than the other. Energy is supplied to the gas from a DC power supply 16 to anode 18 and cathode 20 to produce a glow discharge in the gas. The result is a plane wave output which passes through the less reflective mirror. The operation of this type of laser is well known and need not be described in detail.

As shown in FIGS. 1 and 2 a transverse magnetic field is applied by means of a "C" shaped magnetic core 22 with its pole pieces 24 and 26 positioned on opposite sides of the laser tube 10. A DC power supply 28 is connected to field coil 30 which is wound about core 22 to supply energy thereto. The magnetic field passes transversely through the gas filled gas tube 10 as shown by lines "B." The anode 18 is rotated 90° in FIG. 2 for purpose of clarity.

The current-excited discharge passed through the gas within tube 10 creates a plasma in which the atoms are ionized and electrons are freed. The transverse magnetic field increases the loss of electrons to the tube walls which results in an increase of the axial electric field in order to maintain the power balance in the discharge. This increase of the axial electric field and correspondingly the increased electric field to gas pressure ratio results in a higher electron temperature. The transverse magnetic field results in a higher electron temperature without necessitating a reduction in gas pressure, or results in the same electron temperature at a higher pressure, and produces a higher level of light output power. Up to 100% increase in power has been measured using this technique.

The transverse magnetic field allows an independent control of light output in a DC discharge gas laser. By modulating the magnetic field the light output may be varied. Any well known method of varying the magnetic field may be used, the most obvious being by varying the DC power supply 28.

A novel configuration for modulating the light output is shown in FIG. 3. In this embodiment a transverse magnetic field is used in conjunction with an axial magnetic field to produce a "push-pull" type of modulation. As shown in the figure, a pair of solenoids 32 and 34 are positioned adjacent the gas filled tube 10, one solenoid being diametrically across from the other whereby a longitudinally extending magnetic field is produced through tube 10 when the solenoids 32 and 34 are actuated. A number of turns of conducting wire are positioned around the tube 10 in the form of an axial solenoid 36 whereby an axially extending magnetic field is produced through tube 10 when solenoid 36 is actuated. Solenoids 32 and 34 are connected together to one output terminal of a push-pull type of amplifier driver 38, and solenoid 36 is connected to the other output terminal of the driver 38. A power supply 40 is connected through a modulator 42 to actuate the driver 38 in push-pull fashion in response to the modulation applied to the input signal. The application of an axial magnetic field by solenoid 36 reduces electron temperature Te and decreases light output. Application of the transverse magnetic field by solenoids 32 and 34 increases electron temperature Te and increases light output. To achieve the same depth of modulation, both the axial and transverse fields will require only half as much variation as either field alone. The advantage that accrues using this technique is that less power is needed to effect the same modulation since energy storage and ohmic ($I^2R$) losses in the coils are proportional to the square of the magnetic field strength.

In operation, modulator 42 varies the control signal received by driver 38 in response to some modulating signal (not shown) or to some predetermined control arrangement. Driver 38 actuates coils 32 and 34 and coil 36 alternately in response to the control parameter to thereby alternately increase and decrease the light output of the laser. Thus the laser intensity is modulated in response to the modulation signal by varying the magnetic fields applied thereto.

Although this invention has been described in its preferred embodiment, it is apparent that numerous changes and modifications may be made to the structure and arrangement of parts by those skilled in the art without departing from the inventive teachings embodied herein and encompassed by the following claims.

I claim:
1. A method for modulating the output intensity of a gas laser tube comprising the steps of:
generating a first magnetic field and directing it transversely across said laser tube,
generating a second magnetic field and directing it axially along said laser tube simultaneously with said first magnetic field, and
selectively varying the intensity of said first and second magnetic fields in push-pull relationship.
2. In a gas laser tube:
a first means positioned adjacent said tube,
means for actuating said first means to produce an axial magnetic field along said tube,
a second means positioned adjacent said tube,
means for actuating said second means to produce a transverse magnetic field across said tube simultaneously with said axial magnetic field, and
modulator means for simultaneously varying the intensity of said axial and transverse magnetic fields in push-pull relationship to thereby modulate the light output intensity of said laser.
3. A gas laser tube as in claim 2 in which said first means includes a coil positioned longitudinally about said tube, and in which said second means also includes a coil.

References Cited

UNITED STATES PATENTS 3,149,290  9/1964  Bennett et al. _____ 331—94.5

OTHER REFERENCES

Ahmed et al. (I): Gas Lasers in Magnetic Fields, Proc. IEEE, vol. 52, pp. 1356–57, November 1964.

Ahmed et al. (II): Microwave Electron Cyclotron Resonance Pumping of a Gas Laser, Proc. IEEE, vol. 52, pp. 1737–38, December 1964.

Fork et al.: Broadband Magnetic Field Tuning of Optical Maser, Applied Physics Letters, vol. 2, pp. 180–81, May 1963.

JEWELL H. PEDERSEN, Primary Examiner

E. BAUER, Assistant Examiner